United States Patent [19]

Laval, Jr.

[11] 3,787,016

[45] Jan. 22, 1974

[54] RACK FOR SUPPORTING CABLES AND THE LIKE

[76] Inventor: Claude C. Laval, Jr., 2444 N. Farris, Fresno, Calif.

[22] Filed: Apr. 20, 1972

[21] Appl. No.: 245,948

[52] U.S. Cl.................. 248/49, 211/176, 211/177, 248/68 R, 248/70
[51] Int. Cl............................................. F16l 3/22
[58] Field of Search .... 211/176, 177, 182; 248/243, 248/224, 49, 68 R, 59, 65, 67.7, 70; 287/51, 56; 24/73 B

[56] References Cited
UNITED STATES PATENTS

| | | | |
|---|---|---|---|
| 2,869,902 | 1/1959 | Gleitsman | 287/54 C |
| 3,195,735 | 7/1965 | Jay | 211/182 X |
| 2,398,153 | 4/1949 | Nielsen | 211/182 |
| 3,033,332 | 5/1962 | Geibel | 24/73 B X |
| 2,595,787 | 5/1952 | Heimann | 85/8.8 X |
| 2,144,553 | 1/1939 | Simmonds | 85/8.8 X |
| 1,802,964 | 4/1931 | Brady | 248/68 R X |
| 767,101 | 8/1904 | Brown | 211/177 X |
| 1,843,356 | 2/1932 | Carlough | 287/54 C |
| 164,051 | 6/1875 | Spacht | 85/8.8 X |
| 2,693,093 | 11/1954 | Cutting | 85/8.8 X |

FOREIGN PATENTS OR APPLICATIONS

| | | | |
|---|---|---|---|
| 416,988 | 1/1967 | Switzerland | 287/56 |
| 190,229 | 11/1963 | Sweden | 108/106 |
| 192,017 | 2/1964 | Sweden | 211/176 |

Primary Examiner—Roy D. Frazier
Assistant Examiner—Rodney H. Bonck
Attorney, Agent, or Firm—Huebner & Worrel

[57] ABSTRACT

A rack having a substantially upright support providing a transverse passage defined at its lower side by an upwardly extended lip, an arm slidably received by the passage having a notch fitted downwardly over the lip, and a spacer received in the passage in engagement with the arm blocking removal of the arm from the lip.

8 Claims, 15 Drawing Figures

PATENTED JAN 22 1974 3,787,016

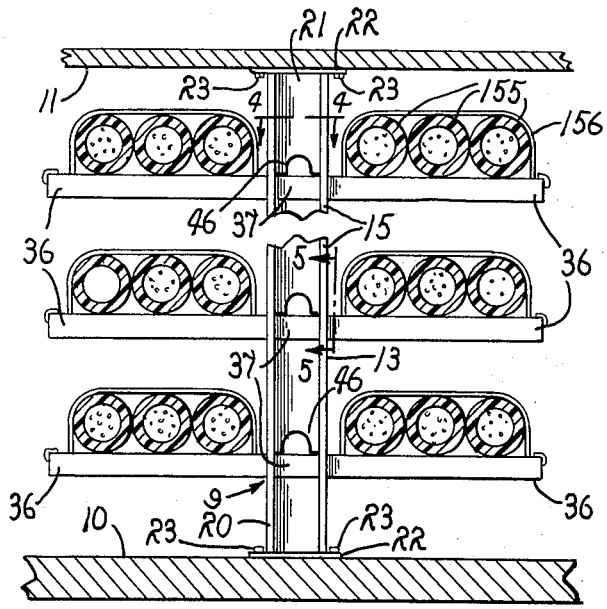
FIG.2.
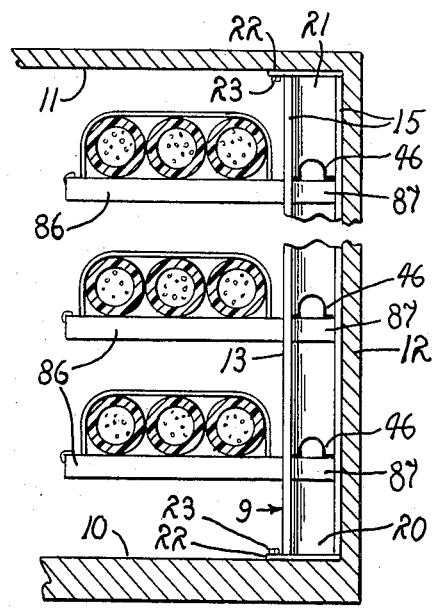
FIG.3.
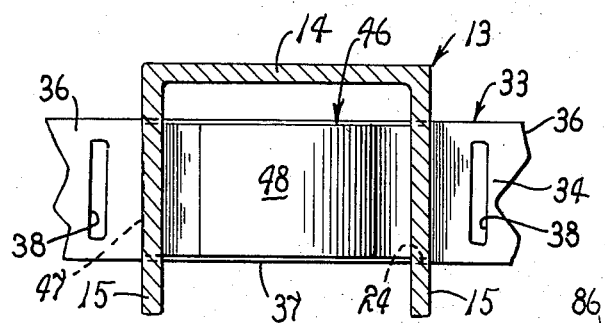
FIG.4.
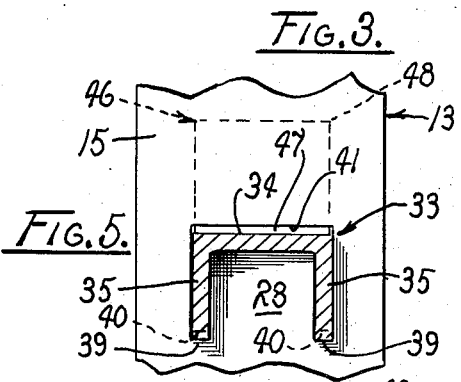
FIG.5.
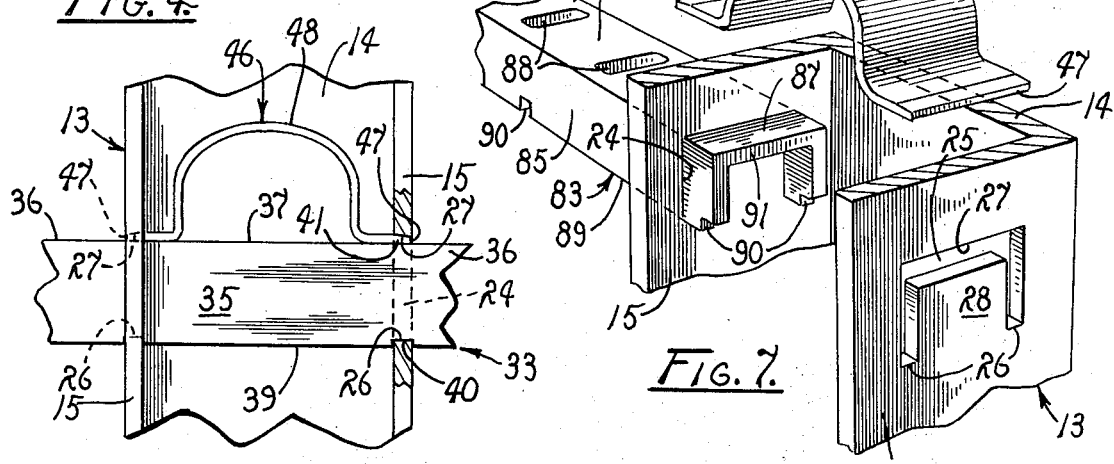
FIG.6.
FIG.7.

PATENTED JAN 22 1974 3,787,016

RACK FOR SUPPORTING CABLES AND THE LIKE

BACKGROUND OF THE INVENTION

In the construction of various types of buildings, factories, seagoing vessels, aircraft and the like, extensive networks of cables and conduits are needed for a variety of purposes. Among such purposes are the transmission of electrical energy, provision for communications, and the transportation of gases and liquids. Conventional racks for mounting such cables and conduits are of relatively heavy, bulky and expensive construction generally having spaced upright standards with cross arms extending therebetween for the support of the cables and conduits. The racks are normally assembled with screws or bolts with a plurality employed to mount each arm at each standard. This construction makes the racks difficult and expensive to assemble and to disassemble when repair or modification of the cables or conduits is necessary. Furthermore, because the cables and conduits are mounted on the cross arms between the standards, it is inordinately difficult and expensive to remove or replace a cable or conduit. Normally, the racks must be disassembled so as to allow the removal of one of the standards in order to permit removal of the cable or the cables or conduits must be endwardly threaded into or out of the racks.

The disadvantages of such conventional racks are particularly apparent in the construction of aircraft and seagoing vessels. In modern ships, for example, several miles of cables for the transmission of electrical energy and for communications are commonly required. Such extensive networks of cables require the use of vast numbers of racks for support of the cables. Assembly of conventional racks for this purpose using screws or bolts is extremely time-consuming and is becoming increasingly more expensive as the cost of manual labor continues to increase. Thus, the cost of construction of a ship is made significantly more expensive than is desirable. Such racks aggravate the pre-existing spacial limitations aboard ship by extending farther than is desirable into already cramped passages. Finally, the problems of weight limitations and distribution, centers of gravity, metacenter positioning and the like are made even more acute, in the construction of ships, by the necessity of using such conventional racks.

It has long been recognized as desirable to have an improved rack for the support of cables and the like which is less expensive per rack, is more convenient to load and unload, is more economical to assemble, is less bulky, is structurally stronger, and is more convenient to disassemble for the modification thereof than conventional racks.

SUMMARY OF THE INVENTION

It is therefore an object of the present invention to provide an improved rack for supporting cables, conduits, and the like which is easily adaptable for use in a wide variety of forms and for a wide variety of purposes.

Another object is to provide such a rack which is less expensive per rack than conventional racks used for the purposes described.

Another object is to provide such a rack which is significantly more economical to assemble than conventional racks.

Another object is to provide such a rack which is of less weight than conventional racks while being structurally stronger than conventional racks.

Another object is to provide such a rack which facilitates loading and unloading of cables and conduits supported thereon.

Another object is to provide such a rack which is easy to assemble and disassemble.

A further object is to provide such a rack which is adaptable for mounting in a variety of types of confined areas.

A still further object is to provide such a rack which is constructed of conventional elements and construction techniques in order to insure inexpensive construction and the convenient replacement of parts.

Further objects and advantages are to provide improved elements and arrangements thereof in a device for the purposes described which is dependable, economical, durable and fully effective in accomplishing its intended purposes.

BRIEF DESCRIPTION OF THE DRAWINGS

FIG. 2 is an end elevation of the rack of the present invention showing numerous cables supported thereon and shown in cross section for illustrative convenience.

FIG. 3 is an end elevation of the rack utilizing a second form of support arm.

FIG. 4 is a somewhat enlarged, fragmentary horizontal section, taken on line 4—4 of FIG. 2.

FIG. 5 is a fragmentary vertical section, taken on line 5—5 of FIG. 2.

FIG. 6 is an enlarged fragmentary end elevation of a portion of the rack viewed in FIG. 2.

FIG. 7 is a somewhat enlarged fragmentary exploded perspective view of a portion of the rack shown in FIG. 3.

DESCRIPTION OF THE PREFERRED EMBODIMENT

Figure 1:
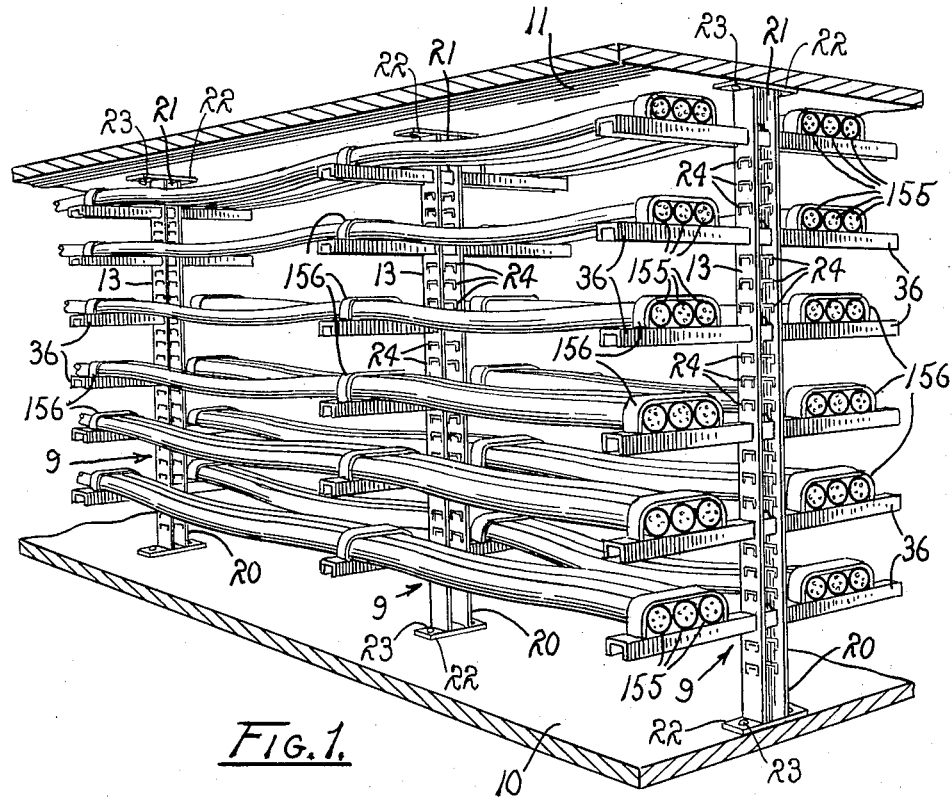
FIG. 1 is a perspective view of a series of racks embodying the principles of the present invention having cables supported thereon, as in shipboard construction.

Referring in greater detail to the drawings, in FIG. 1 the rack for supporting cables and the like is generally indicated by the numeral 9. For illustrative purposes, the rack is shown mounted on and between a floor 10 and ceiling 11. An alternate form of the rack 9 is shown in FIG. 3 mounted on the floor 10 adjacent to a wall 12, to which more specific reference will subsequently be made. It will be noted that the floor and wall can be a deck and bulkhead of a ship or corresponding portions of the fuselage of an airplane and the illustrative environment is not intended to limit the application of the invention.

The rack 9 has a channel-shaped upright standard or support 13 having a back portion 14 and opposite sides 15 coextensively extending in spaced, parallel relation from the back portion. While the support 13 and other supports subsequently described are transversely of U-shape, it is to be understood that they may be of other configuration and provide the opposite sides 15. The support 13 has a lower end 20 and an upper end 21. Both ends afford laterally extended mounting flanges 22 through which are secured bolts 23 to mount the support in vertically standing relation on and between the floor 10 and ceiling 11. The support can also be mounted by any other suitable means, such as by welding. Further, the support need not be extended from floor to ceiling. It can be suspended from a support, upwardly extended from a base, or otherwise sustained in position. A plurality of passages 24 extend horizontally through the supports in predetermined relatively closely spaced relation, preferably one inch or so apart, along the length of the support between the lower end and the upper end thereof. Each of the passages consists of a pair of horizontally aligned slots 25 individually provided in the opposite sides 15 of the support, as best shown in FIG. 7. Each of the slots has an inverted U or channel shape having a pair of spaced lower ends or lips 26 and an upper end or shoulder 27. The lips are separated by upwardly extended tabs 28.

The rack 9 further provides a plurality of arms 33 mounted horizontally thereon. The rack is designed to mount a variety of types of arms for use in a variety of situations, but their transverse shape and manner of mounting are substantially the same. Each of the arms is of inverted channel-shape having a top wall 34 and spaced parallel side walls 35, and is slidably receivable in the passages 24. Each of the arms has cable supporting portions 36 oppositely extended from the support 13 and a central attachment portion 37, as best shown in FIG. 2, received in the support. A plurality of slots 38 are provided in spaced relation in the top wall 34 of the opposite support portions of the arm. Each of the side walls of each arm has a lower edge 39 in which are provided a pair of notches 40. The notches are spaced and sized to fit downwardly over the lips 26, as best shown in FIG. 6.

Each of the arms 33 is individually received in a passage 24 of the support 13 so that the portions 36 of the arm extend on opposite sides of the support, as best shown in FIGS. 1 and 2. With the notches 40 in alignment with the opposite sides 15 of the support, the arm is slid downwardly so that the opposite sides at the lower ends 26 of the slot are received in the notches. So positioned in the passages, a gap 41 is provided between the top wall 34 of each arm and the upper end 27 or shoulder of each passage. The gap preferably has a vertical dimension substantially equal to the extent to which the notches 40 fit downwardly over the lips.

A removable spacer or lock 46, having opposite ends or spacers 47 and a central, resiliently arched spring 48, is adapted for retention of the arms 33 in the passages 24 of the supports 13. Lock 46 constitutes the first form of lock shown in FIGS. 2 through 8. Positioning of the lock is accomplished by first compressing the spring so as to retract the opposite ends. The lock is then positioned between the opposite sides 15 of the support and the spring released to allow the opposite ends 47 of the lock to be extended into the gaps 41 of the slots 25. The ends or spacers 47 are preferably tightly fitted into the gaps. The lock blocks upward movement of its arm so that the lips 26 engage the notches 40 thereby locking the arm within the support.

Figure 9:
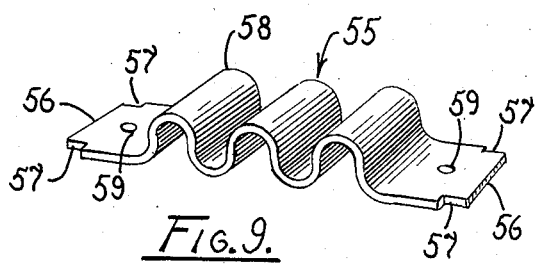
FIG. 9 is a perspective view of a second form of a spring lock or spacer for the rack.
Figure 10:
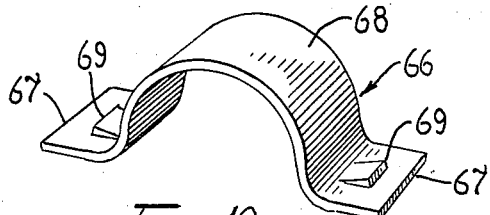
FIG. 10 is a perspective view of a third form of spring lock or spacer for the rack.
Figure 11:
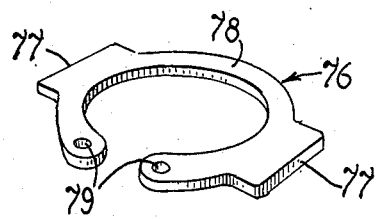
FIG. 11 is a perspective view of a fourth form of spring lock or spacer for the rack.

The lock may take a variety of alternate forms, as illustrated in FIGS. 9, 10 and 11. A second form of lock 55 is shown in FIG. 9. Lock 55 has opposite ends or spacers 56 each having notches 57 on opposite sides thereof. As before, the spacers are fitted to the gaps 41. The lock 55 has a central sinuous spring 58 integrally provided between the ends. Bores 59 are individually provided adjacent to the ends for use with a pliers, not shown, for compression of the spring.

A third form of lock 66 is shown in FIG. 10. The lock 66 has opposite ends or spacers 67, a central, resiliently arched spring 68, and stops 69 individually disposed adjacent to the opposite ends of the lock to limit extension of the ends within the gaps 41 of the rack 9, to which they are fitted.

The fourth form of lock 76 is shown in FIG. 11. The lock 76 has opposite ends or spacers 77, a semi-circular spring 78 interconnecting the ends, and bores 79 for use with pliers, not shown, for compression of the spring. In all of these various forms, the spacers of the locks operate substantially in the same manner to block elevational movement of the arms 33 and thus to insure their locked retention in the supports 13.

Figure 8:
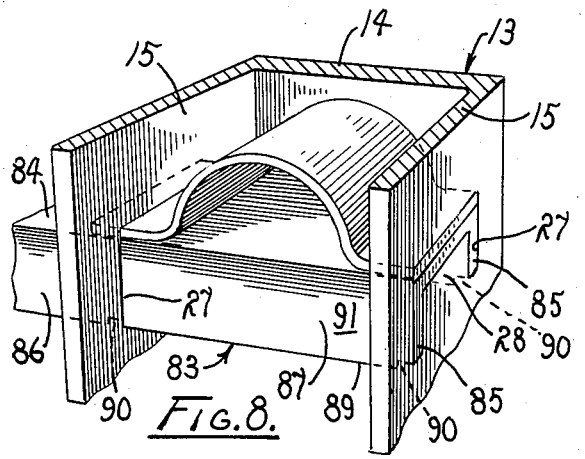
FIG. 8 is a fragmentary perspective view of the portions of the rack of FIG. 7 showing it in its assembled configuration.

A second form of arm 83 is shown in FIGS. 3, 7 and 8. This form of arm is substantially similar in certain respects to the arms 33 previously described. As with arm 33, each of the arms 83 is of inverted channel shape having a top wall 84 and spaced parallel side walls 85. Unlike arm 33, arm 83 has only one support portion 86. The arm has an integral attachment portion 87. The support portion of the arm has slots 88 therethrough for the attachment of cables or the like. The attachment portion has lower edges 89 having notches 90 therein disposed in the same relationship as described with the first form of the arm 33. The arm has an attachment end 91 at the end thereof opposite the support portion of the arm, as best shown in FIG. 7. The attachment end is proportioned so that when the arm 83 is received and mounted in the support 13, the attachment end is flush with the opposite side 15 of the support, as best shown in FIG. 8. As before, when the attachment portion is extended through the passages 24, the notches 90 are fitted downwardly over the lips 26 and any of the several locks 40, 55, 66 or 76 is inserted through the gaps 41 to lock the arm in place.

Figure 12:
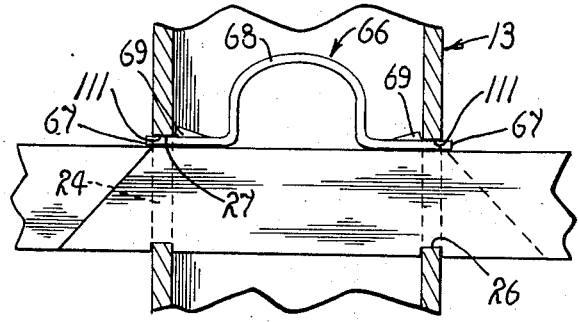
FIG. 12 is a fragmentary vertical section of a portion of the rack utilizing a third form of support arm.
Figure 13:
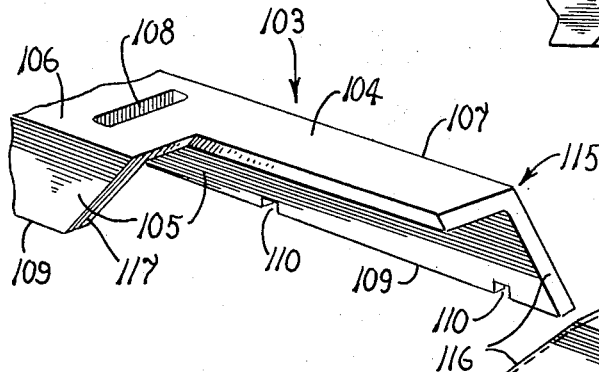
FIG. 13 is a fragmentary perspective of a pair of segments making up the third form of support arm shown in disassembled relation.
Figure 13:
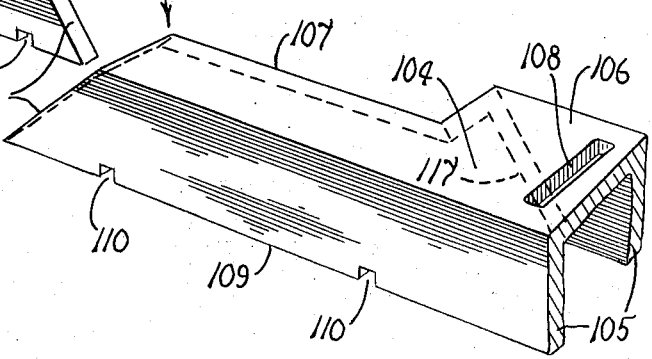

A third form of arm 103 is shown in FIGS. 12 and 13. The arm 103 is of inverted channel shape having a top wall 104 and spaced, parallel side walls 105. The arm further provides opposite support portions 106 and an attachment portion 107. Slots 108 are provided in the support portions of the arm for the attachment of cables thereto. The arm has lower edges 109 having notches 110 therein, positioned as described in regard to the first form of the arm 33. When mounted in the support 13, as shown in FIG. 12, the arm 103 provides a gap 111 between the top wall 104 and the upper end 27 of each passage 24 to receive a lock 40, 55, 66 or 76. In distinction from the first form of the support arm 33, the third form of the support arm 103 is composed of two identical segments 115. The attachment portion 107 of each segment is directed, as best shown in FIG. 13, so that two such segments can be positioned in precise mating engagement. Only one of the side walls 105 of each segment extends into the attachment portion of the arm. This side wall contains two of the notches 110, as shown in FIG. 13. This same side wall and the adjacent side of its integral top wall 105 is bisected in a plane inclined toward the attaching portion 107 to provide an outwardly sloped contact surface 116. The side wall 105 and adjacent side of its integral top wall 104 of the arm opposite that having the contact surface 116 is correspondingly inclined to form a mating contact surface 117 at an angle which is the supplement of the outwardly sloped contact surface 116. Since the segments are identical, there are mating surfaces 116 and 117 on opposite sides of the arm. The segments are also bisected in a plane normal to the top wall 104 and interconnecting the planes of the contacting surfaces. It will be noted that with the lock 46 in position in the gap 111, as previously described in regard to the first form of the arm 33, the third form of the arm 103 is securely retained in position in the support. The side wall and top wall 104 of each segment which form the attachment portion of the arm extend entirely through both slots 25 of the support 13, as shown in FIG. 12, so as to be secure against downward pressure exerted on the support portions 106 of the arm. Similarly, the surfaces 116 and 117 of opposite segments abut each other further to reinforce the arm.

Figure 14:
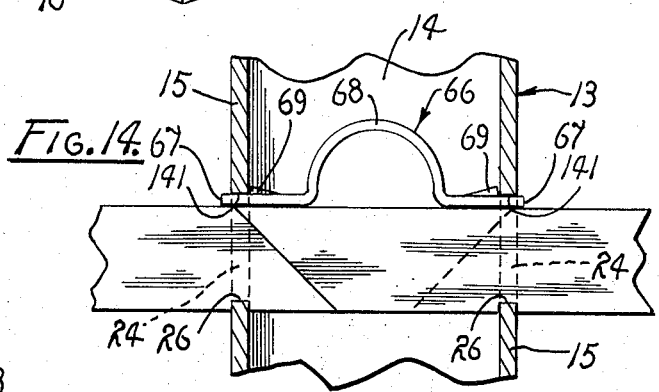
FIG. 14 is a fragmentary vertical section of a portion of the rack utilizing a fourth form of support arm.
Figure 15:
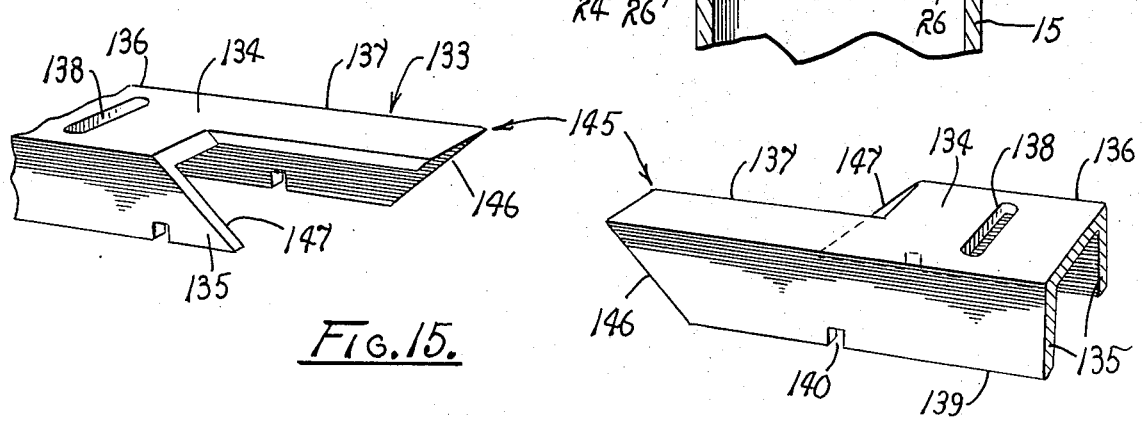
FIG. 15 is a fragmentary perspective of a pair of segments making up the fourth form of support arm shown in disassembled relation.

A fourth form of support arm 133 is shown in FIGS. 14 and 15. This arm, as in the other forms, is of an inverted channel shape having a top wall 134 and spaced, parallel side walls 135. The arm further provides opposite support portions 136 and an attachment portion 137. Slots 138 are provided in the support portions of the arm for the attachment of cables thereto. The arm has lower edges 139 having notches 140 therein, positioned as described in regard to the first form of the arm 33. When mounted in the support 13, as shown in FIG. 14, the arm 133 provides a gap 141 between the top wall 134 and the upper end 27 of each passage 24. As in the third form of arm 103, the fourth form of arm 133 is composed of two identical segments 145. The attachment portion 137 of each segment is bisected, as best shown in FIG. 15, so that two segments can be positioned in precise mating engagement. The side walls 135 of each segment extend different distances into the attachment portion of each arm. The side wall extending farthest into the attachment portion has a downwardly and inwardly sloped contact surface 146. The other side wall extends outwardly to form a mating contact surface 147 at an angle which is the supplement of surface 146. The side walls of each segment have notches 140 in transverse alignment to fit downwardly over the lips 26. As with arm 103, when one of the locks 46, 55, 66, or 76 is positioned in the gap 141, the arm 133 is securely retained in position in the support 13 with the identical segments dependably interlocked to form their respective arms.

The support arms 33, 83, 103, and 133 are designed to support a plurality of cables 155 thereon, as shown in FIG. 1 with the arms 33. The cables are retained in position on the arms by bands or straps 156 which are extended about the cables and are fastened through the slots 38, 88, 108, 138 of the arms 33, 83, 103 and 133, respectively, in any suitable manner.

OPERATION

The operation of the described embodiments of the subject invention is believed to be clearly apparent and is briefly summarized at this point. Assembly of the racks 9 in an aligned series in a building, seagoing vessel, or the like is accomplished, as described. The supports 13 are secured on and between the floor 10 and ceiling 11 by bolts 23 to retain the supports in upright relation. Depending upon the number and diameter of cables 155 to be supported on the rack, the arms 33 of the first form are received through selected passages 24 so as to provide a sufficient number of arms with sufficient space therebetween for the cables to be supported thereon. The arms are easily positioned simply by sliding them endwardly through their respective passages until the notches 40 are in juxtaposition to the lips 26 and the arms thrust downwardly to fit the notches over their respective lips. Preferably all of the passages 24 will not initially be used in order to permit modification and adaptation of the rack for the supporting of additional cables, if the need arises. Subsequently, the locks 46 are positioned with their opposite ends or spacers 47 received in the gaps 41, as already described, securely to retain the arms in locked relation on the support. Thereafter, the cables 155 are strung along the arms in the desired fashion and secured in position on each arm with the use of the bands 156, as best shown in FIGS. 1 and 2.

In positions of difficult access, as in narrow passageways, there is sometimes insufficient room to permit insertion of the arm 33 into the passages 24 in the supports 13. The arms 83, 103 and 133 easily avoid this problem.

As shown in FIG. 3, with the second form 83 of the arms, the support may be mounted against the wall or bulkhead 12. The arms are then slid into the passages 24 and the notches 57 fitted downwardly over the lips 26. In such position, the inner end of the arm is closely adjacent to, and may abut, the bulkhead. The lock 46 is then inserted into position so that the spacers 47 occupy the gaps 41 and preclude inadvertent disassociation of the arms from the supports. Of course, any of the other forms of locks may be employed.

If it is desired to utilize the support 13 centrally of a narrow passage or other restricted passages, the third or fourth forms of the arms may be utilized. As shown in FIGS. 12 and 13, the segments 115 of the third form 103 are slid into a common passage 24 from opposite sides. Since each segment is only a little longer than one-half of the entire arm 103 which they constitute, this can be done in even restricted spaces. The surfaces 116 and 117 are brought into facing engagement and the notches 110 fitted downwardly over the lips 26. The insertion of the lock 68, or any of the other locks, to position the spacers 67 in the gaps 111 not only locks the arms 103 in the support but also dependably joins the segments to form the arm. The cables 155 are then mounted on the arms. As the segments of the arms are loaded, they tend to pivot about their adjacent lip 26. Thus, such loads are translated into forces exerted upwardly by the surfaces 116 against the surfaces 117 so that each segment supports its companion segment.

The fourth form 133 of the arms is mounted on the supports 13 in substantially the same manner as the third form. As best seen in FIGS. 15 and 16, the segments 145 are inserted into a common passage 24 from opposite sides. The surfaces 146 and 147 are brought into engagement, the notches 140 fitted downwardly over the lips 26 and the lock 66 installed. The cables 155 are then put into place.

Disassembly and modification of the rack 9 is accomplished quickly and simply by removing and repositioning the arms 33, 83, 103 or 133. The removal of an arm is accomplished by removing the lock 46, 55, 66 or 76 and sliding the arm, or its segments endwardly from the passages 24. With the first form 46, this is performed by grasping the arched spring 48, compressing the spring to retract the opposite ends 47 from the gaps 41, and removing the lock from the support 13. In the second form of lock 55, compression of the pleated spring 58 is accomplished by the use of pliers, not shown, having pronged ends for receipt in the bores 59 to compress the spring 58. Compression of the arched spring 68 of the third form of lock 66 is accomplished as described with the first form of lock 46. Compression of the semi-circular spring 78 of the fourth form of lock 76 is accomplished by inserting the pronged end of pliers, not shown, in the bores 79 and compressing the spring to withdraw the spacers 77.

Since the cables 155 are mounted on the arms 33 outwardly of the support 13, they can be removed and replaced without having to remove the support from its mounting on and between the floor 10 and ceiling 11 and without having to thread the cable between supports.

The second form of the arm 83 illustrates an alternate form of rack which permits the mounting of cables 155 thereon in more confined areas than with the first form of the arm 33. The third and fourth forms of arms 103 and 133 illustrate a structure which permits arms of a length equivalent to that of the first form of the arm 33 to be mounted in confined areas while at the same time permitting removal of the arms from the support for modification of the rack. There is a spacial limitation involved in the first form of the arm 33 in that in order to remove it, the arm must be drawn through the support 13. However, the segments 115 of the third form of the arm 103 and the segments 145 of the fourth form 133 can be removed from the passage 24 without having to be drawn entirely through the support since the segments can be slipped out of the opposite sides 15 of the support. Racks utilizing these arms can be positioned in extremely confined areas.

Since each rack 9 requires only a single support 13 and the support and the arms 33, 83, 103 and 133 are of channeled construction, the rack is of significantly lighter weight than conventional racks. Such construction also allows the supports and arms each to be cut and formed in a single forging operation during the manufacture thereof thereby reducing manufacturing costs. No screws or bolts are required to mount the arms on the support although they can be utilized as desired. Furthermore, use of the spring locks 46, 55, 66, and 76 in combination with the passages 24 insures that the rack is of significantly stronger construction than conventional racks employing screws or bolts. Additionally, and perhaps more significantly, the use of the spring locks greatly reduces the manual labor required in assembling and disassembling the rack 9, thereby greatly reducing the expense involved in employing such racks. The arms in all forms define open shelves for receipt of the cables thereon without removing or disturbing any of the supports and without the necessity of endwardly threading the cables into position. Finally, modification or readaptation of the rack to a particular use after initial assembly is greatly facilitated with the rack of the present invention as compared with conventional racks. The arms can be raised, lowered or respaced quickly and easily.

Although the invention has been herein shown and described in what are conceived to be the most practical and preferred embodiments, it is recognized that departures may be made therefrom within the scope of the invention, which is not to be limited to the illustrative details disclosed.

Having described my invention, what I claim as new and desire to secure by Letters Patent is:

1. A rack comprising erect support means providing substantially parallel spaced elements having substantially horizontally aligned passages therethrough bounded by upwardly disposed lips and downwardly disposed shoulders upwardly spaced from the lips; an arm extended through the passages having a pair of separable segments providing mounting portions which are substantially mirror images of each other disposed in the passages and providing oppositely outwardly extended ends, each segment having an outer endwardly disposed inclined contact surface, a laterally disposed central edge longitudinally inwardly extended from said outer contact surface and an inner endwardly disposed contact surface oppositely inclined from said segment's outer contact surface, the outer contact surfaces being fitted to the inner contact surfaces of the opposite segments with the central edges in fitted engagement, a contact surface of one segment overlaying the other segment at one passage and a contact surface of said other segment overlaying said one segment at the other passage; and spacing means disposed in each passage between the shoulder thereof and the segments holding the segments downwardly in said fitted engagement.

2. The rack of claim 1 in which the outer contact surfaces overlay the inner contact surfaces to which they are fitted, each of the segments has downwardly disposed notch means adjacent to its inner contact surface fitted downwardly over an adjacent lip, and the spacing means holds said notch means downwardly in fitted relation to their respective lips by holding the outer contact surfaces downwardly against their inner contact surfaces.

3. A rack comprising erect support means providing parallel spaced elements having substantially horizontally aligned passages therethrough bounded by upwardly disposed lips and downwardly disposed shoulders upwardly spaced from the lips; an arm extended through the passages having a pair of separable segments providing mounting portions which are substantially mirror images of each other disposed in the passages in fitted engagement and providing oppositely extended ends, each mounting portion having an extended side providing an inclined beveled end portion disposed at one passage and an opposite shorter side having an oppositely inclined beveled inner portion disposed at the other passage, the end portion of each segment being in fitted engagement with the inner portion of the other segment, a beveled portion of one segment overlaying a beveled portion of the opposite segment adjacent to one passage and the opposite beveled portion of said one segment being overlaid by the opposite beveled portion of said opposite segment adjacent to the opposite passage; and removable spacing means disposed in each passage between the overlaying portion disposed therein and the shoulder thereabove holding said overlaying beveled portion downwardly against the beveled portion therebelow.

4. The rack of claim 3 in which the beveled end portions of the extended sides overlay the beveled inner portions of the shorter sides, the mounting portions have downwardly disposed notch means adjacent to their beveled inner portions fitted downwardly on respective lips, and the spacing means serves to retain the notch means on the lips by holding the overlaying beveled end portions downwardly against the beveled inner end portions.

5. A rack comprising erect support means providing substantially parallel spaced sides having substantially horizontally aligned passages therethrough bounded by upwardly disposed lips and downwardly disposed shoulders upwardly spaced from the lips; an arm extended through the passages having a pair of separable segments providing mounting portions which are substantially mirror images of each other disposed in the passages and having oppositely outwardly extended ends, the segments being of inverted substantially U-shape, each mounting portion having an elongated side wall providing an inclined beveled end portion disposed at one passage and a shorter side wall having an oppositely inclined beveled inner portion disposed at the other passage, the end portion of each segment being in fitted engagement with the inner portion of the other segment, a beveled portion of segment overlaying a beveled portion of the opposite segment adjacent to one passage and the opposite beveled portion of said one segment being overlaid by the opposite beveled portion of said opposite segment adjacent to the opposite passage; and removable spacing means disposed in each passage between the overlaying beveled portion disposed thereat and the shoulder thereabove holding said overlaying portion downwardly against the beveled portion of the opposite segment therebelow.

6. The rack of claim 5 in which the beveled end portions overlay the beveled inner portions, the side walls of the mounting portions have notches therein aligned transversely thereof and fitted downwardly over respective lips, and the spacing means serves to hold the end portions downwardly against the inner portions and the notches downwardly over their respective lips.

7. The rack of claim 5 in which the elongated side walls project through both passages and each has spaced notches fitted downwardly over the lips and is supported by the lips, and the shorter sides terminate short of the lips with the inner beveled portions thereof overlaying and rested upon the beveled end portions with which they are in fitted engagement.

8. The rack of claim 7 in which the spacing means hold the elongated side walls downwardly against the lips and the shorter side walls downwardly against the beveled end portions of the elongated side walls.

* * * * *

UNITED STATES PATENT OFFICE
CERTIFICATE OF CORRECTION

Patent No. 3,787,016      Dated January 22, 1974

Inventor(s)     Claude C. Laval, Jr.

It is certified that error appears in the above-identified patent and that said Letters Patent are hereby corrected as shown below:

In the Specification:

Col. 5, line 6 after "is" and before the comma "," delete "directed"

and insert ---disected---.

In the Claims:

Col. 10, line 3 after "of" and before "segment"

insert ---one---.

Signed and sealed this 30th day of July 1974.

(SEAL)
Attest:

McCOY M. GIBSON, JR.            C. MARSHALL DANN
Attesting Officer                 Commissioner of Patents